Oct. 29, 1968 C. M. AEBI 3,408,192
LIGHT-SENSITIVE DIAZOTYPE COMPOSITIONS AND ELEMENTS
Filed June 10, 1964

DIRECT IMAGE

REVERSE IMAGE

INVENTOR.
CLAUDE M. AEBI
BY
Sughrue, Rothwell, Mion, Zinn & Macpeak
ATTORNEYS

United States Patent Office 3,408,192
Patented Oct. 29, 1968

3,408,192
LIGHT-SENSITIVE DIAZOTYPE COMPOSITIONS AND ELEMENTS

Claude M. Aebi, Endicott, N.Y., assignor to International Business Machines Corporation, New York, N.Y., a corporation of New York Filed June 10, 1964, Ser. No. 373,914
5 Claims. (Cl. 96—49)

ABSTRACT OF THE DISCLOSURE

A light-sensitive diazotype element capable of yielding both positive and negative color-forming and vesicular images comprising a diazonium compound, a coupler, an acid stabilizer, a coupler generator, a base generator and film-forming resin capable of out-diffusing nitrogen gas within ten seconds, the coupler and base generators being stable below about 100° C.

Figure 1A:
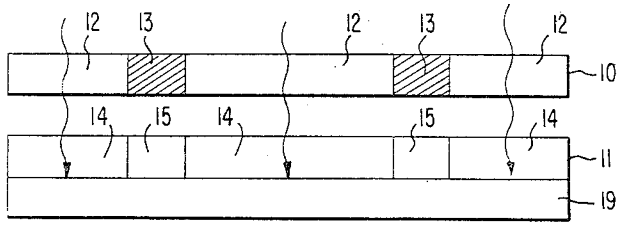

The present invention relates to light-sensitve diazotype elements, such as films, copying papers or the like, which are capable of making visual records corresponding to an original and the invention also relates to compositions for producing such elements. More specifically, the present invention relates to light-sensitive diazotype elements and compositions which are capable of yielding both positive and negative images.

With some conventional copying systems, it is necessary to begin with a positive original in order to obtain a positive film or copy. Conversely, in such systems, a negative original is generally required to obtain a negative film or copy. In certain other copying systems, only the reverse of the original image is obtained, so the original must be the opposite of the desired image.

In order to eliminate the inflexibility of "one-way" systems, it is the object of the present invention to provide light-sensitive diazotype elements and compositions which are developable by heat to yield either direct or reverse images.

The manner in which the objects of the present invention are achieved will be apparent form the following detailed description of the invention, considered in the light of the accompanying drawing.

Figure 1B:
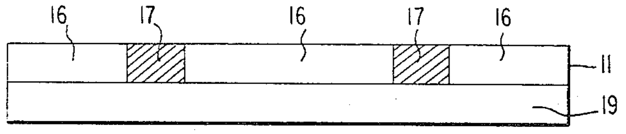
Figure 2A:
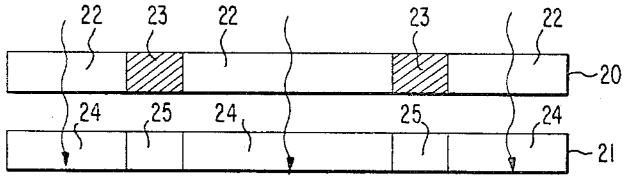
Figure 2B:
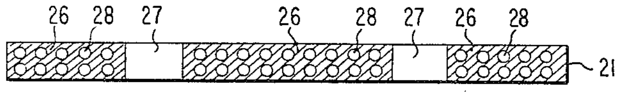
Figure 3:
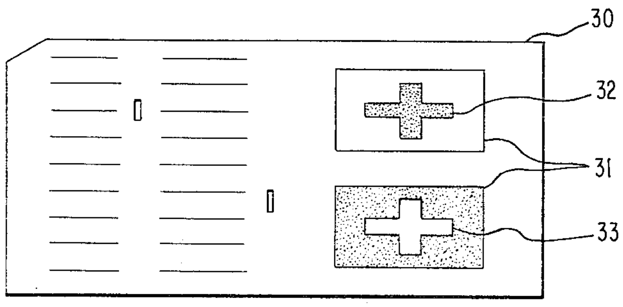

In the drawing:

FIGURES 1(*a*) and (*b*) are schematic, cross-sectional edge views of an original and of a visual recording element in accordance with the present invention, illustrating development of a direct or positive image, FIGURES 2(*a*) and (*b*) are schematic, cross-sectional edge views of an original and of a visual recording element in accordance with the present invention, illustrating development of a reverse or negative image, and FIGURE 3 is a plan view of a photo-aperture card incorporating elements of the present invention.

In accordance with the present invention, compositions are provided which comprise a diazonium compound, a coupler, an acid stabilizer, a secondary stabilizer, a compound or mixture of compounds selected from the group consisting of thiourea, guanidine and cyanoguanidine or other base generators and a resin.

The diazonium compound used in the composition must meet the following essential requirements: (1) It must decompose when subjected to ultra violet or visible light to yield nitrogen; (3) It must be stable below temperatures of about 100° C.; and (3) It must be capable of reacting with the coupler in the composition at temperatures above about 100° C. to form black or colored reaction products.

All commercially available diazonium compounds are useful in the present invention. These include, for example, p-diazo dimethylaniline, p-diazo diethylaniline, p-diazo-N-ethyl-N-hydroxyethylaniline, p-diazo-N-methyl-N - hydroxyethylaniline, p-diazo-N-ethyl-o-toluidine, p-diazo diethyl-m-toluidine, p - diazo-N-ethyl-N-benzylaniline, 4-diazo-1-morpholinobenzene, 4-diazo - 1 - morpholino-2,5-diethoxybenzene, etc. The stabilizing salts of the diazonium compounds may be any of those normally used, such as zinc chloride, borofluoride, cadmium chloride, tin chloride, etc.

The couplers used in the present composition are compounds which enter a color forming reaction with the light-sensitive diazonium compound. The term "coupler" is also intended to include compounds called coupler generators which yield coupling components when they are heated.

Commercially available couplers may be used in the present invention. These include, for example, 2,2′,4,4′-tetrahydroxybiphenyl, 3,3′,5,5′-tetrahydroxybiphenyl, 3,5-resorcyclic acid ethanol amide, 2-hydroxy-3-naphthoic acid amide, N-beta hydroxyethyl-2-hydroxy naphthalene-3-carboxamide, N,N′-ethylene-bis-aceto acetamide, tetramethylene diamine-bis-aceto acetamide and others, 2,3-dihydroxy naphthalene-6-sodium sulfonate, 2,3-dihydroxy naphthalene, resorcinol, monochlororesorcinol, 7-hydroxy-1,2-naphthimidazole, etc.

Where a coupler generator is employed, it must be a compound which is stable below about 100° C. Suitable coupler generators include, for example, citric acid-cyanoguanidine, malonic acid-cyanoguanidine, maleic acid-cyanoguanidine, aconitic acid-cyanoguanidine, homophthalic acid-cyanoguanidine, etc.

The acid stabilizer may be citric acid, tartaric acid, acetic acid, or any other acid which is commonly employed to stabilize diazonium compositions. Such acids are added in an amount sufficient to maintain the pH of the system at below pH 7 under normal ambient conditions to prevent pre-coupling reactions. Other acid stabilizers include sulfosalicyclic acid, maleic acid, citraconic acid, aconitic acid, etc.

Secondary stabilizers may comprise zinc chloride, 1,3,6-trisodium naphthalene sulfonate and/or aluminum sulfate.

The base generator is a compound which decomposes or reacts to form alkaline products and the alkaline products, in turn, neutralize the stabilizing acid and raise the pH of the system to a level at which coupling proceeds.

It is critical that the resin matrix be a thermoplastic characterized by a high rate of gas diffusion. This rate of diffusion must be such that any nitrogen gas formed by light exposure of the system leaks out of the resin matrix in ten seconds or less.

The vehicle is a film-forming resin which is inert with respect to the ingredients dispersed in it and is capable of forming coatings or self-supporting films. The resin, in the form of thin coatings or films up to a few mils in thickness, must rapidly diffuse within ten seconds the nitrogen gas formed by the decomposition of the diazonium compound upon exposure to light.

Some resins allow gases to diffuse at the desired speed when the resin is in the form of a thin self-supporting film or a thin coating. Other resins may be mixed with plasticizers or blended with other resins to increase or decrease the diffusion rate of nitrogen gas through a film or coating of the resin.

A wide variety of resins may be used in the present composition, including, for example, polystyrene, ethyl cellulose, polyvinyl butyral, etc. Various copolymers may also be employed, and these are usually plasticized to increase the rate of nitrogen diffusion. Suitable copolymers include, for example, vinylidene chloride-acrylonitrile, vinylidene chloride-vinyl chloride, and vinyl chloride-vinyl acetate.

The speed of gas diffusion of such resins may be modified to the desired level by blending in other resins, such as various polyacrylic and polymethylacrylic esters. These blends generally have increased speed of gas release and permit the use of resin matrices which otherwise would diffuse nitrogen too slowly.

It is also important that both the coupler generator and the base generator, where used, be compounds which do not decompose or react rapidly to bring about the color-forming reaction at temperatures at which a vesicular image is thermally developed in a film of the present composition. Vesicular images are ordinarily developed at temperatures of from about 60° C. to 150° C. or higher. However, exposure for only a few seconds at the more elevated temperature is sufficient to develop the vesicular image. There is ordinarily a substantial time lag, on the order of 30 to 60 seconds, at such temperatures before the base and/or coupler generators decompose and bring about a color-forming reaction.

While the exact proportions of the ingredients are not critical, good results have been obtained with systems of the following approximate composition:

| Ingredient: | Percent by weight |
|---|---|
| Light-sensitive diazonium salt | 0.4 to 5 |
| Coupler (or) | 0.4 to 7 |
| Coupler generator | 1 to 20 |
| Acid stabilizer | 1 to 25 |
| Thiourea, guanidine, cyanoguanidine or mixtures thereof (optional) | 1 to 10 |
| Base generator (optional) | 1 to 10 |
| Resin vehicle solution in volatile solvent | Balance |

As will be seen from the above, the compositions ordinarily are prepared as solutions of the active ingredients in a volatile solvent for the resin matrix. The amounts of resin and solvent in the solution may vary quite widely. Ordinarily, about 5% to 40% or more of the resin is dissolved in the solvent(s). The solution is then cast or coated onto a support and is dried by evaporation of the volatile solvent. The resulting film may remain on the support or may be stripped and transferred to another support or used as a self-supporting element.

The resin matrix may be dissolved in any conventional volatile solvent, such as methanol, acetone, ethanol, isopropanol, propanol, butanol, methyl ethyl ketone and mixtures of the preceding solvents.

In using the elements of the present invention, exposure may be made in any conventional manner. For example, referred to FIG. 1(*a*), a positive original 10 may be placed close to or in surface contact with a film element or copying paper 11 made in accordance with the invention. Areas 13 indicate the opaque portions and areas 12 the transparent or translucent portions of the original. Actinic light (arrows) is then passed through the original 10 so as to impinge on the surface of element 11 which is a coating comprising the compositions of the invention deposited on a suitable substrate 19.

In the zones 14, where the light has been received, the diazonium compound is decomposed producing nitrogen. The diazonium compound remains undecomposed in unexposed zones 15.

Due to the high permeability of the resin vehicle to nitrogen, the nitrogen gas is rapidly diffused out of zones 14 within about ten seconds.

The element may then be developed, FIG. 1(*b*), by ammonia or by heating to about 100° C. or above to form a direct positive dye image 17 corresponding to the positive original. No development takes place at zones 16 since the diazonium salt there has previously been decomposed and the nitrogen gas has been diffused out of the coating.

Element 11 may be unsupported or may be coated on a substrate 19 as shown in FIG. 1. The support may be an opaque material, such as paper, or a transparent plastic. Where the support is transparent, the element itself may be employed as a film for projection or reproduction purposes, after development of the image.

Referring to FIG. 2(*a*), a positive original 20 is placed adjacent to or in surface contact with an element 21 which comprises a composition in accordance with the present invention. Element 21 is exposed to actinic light (arrows) through original 20. The light passes through translucent or transparent regions 22, but is blocked by opaque regions 23.

In zones 24 of element 21, on which the ultraviolet light impinges, the diazonium compound is decomposed and nitrogen is formed. No decomposition of the diazonium compound takes place in areas 25 which are screened from the light.

Immediately after exposure, i.e., within ten seconds and preferably within about five seconds, element 21 is heated to soften the resin vehicle. This permits the trapped nitrogen to expand somewhat before it is completely diffused, thus forming a plurality of cells or voids 28 in zones 26, as seen in FIG. 2(*b*). Heating to a temperature of from about 80° to 90° C. for a few seconds is ordinarily sufficient to develop the vesicular image in regions 26. The element is then subjected to an overall exposure to actinic light and the nitrogen formed by decomposing the diazonium compound in regions 27 is permitted to diffuse out of the element.

In this manner, a negative image is produced using the same positive original and the same type of element as were employed to obtain a positive image by the previously described procedure.

It will be clear also that, where the original is a negative, either positive or negative images may be produced using the compositions and elements of this invention.

The elements of the invention find particular utility as microfilm inserts for photoaperture cards. As shown in FIG. 3 of the drawing, a data processing card 30 may be provided with film inserts 31 of the present type which may be exposed through a positive and developed to provide both a positive 32 and negative 33 microfilm record of the original.

Of course, while the present invention is particularly suited to the manufacture of microfilm for aperture card inserts, the composition of the invention may also be used in making copying papers, transparencies and in many other fields.

Examples of specific materials useful as ingredients of the present compositions have already been given. However, the following examples of complete systems in accordance with the invention will aid a complete understanding of the invention.

*Example 1*

A 25% by weight solution of polystyrene in a solvent composed of 3 volumes of methyl ethyl ketone to 1 volume of methanol is prepared. To 100 ml. of the vehicle solution there are then added the following ingredients:

| | Percent |
|---|---|
| p-Diazo diethylaniline zinc chloride | 1 |
| 2,3-dihydroxy naphthalene (coupler) | 1 |
| Citric acid | 5 |
| Thiourea | 2 |
| Cyanoguanidine | 2.5 |

The solution is mixed thoroughly until the ingredients are all dissolved and is then coated on a transparent Mylar substrate to form a coating about 1 mil thick. The coating is dried overnight to evaporate all of the volatile solvent and is cut into four sections.

One section is exposed to ultraviolet light through a positive original for 20 seconds. The film is allowed to stand for 10 seconds and is then heat developed at 150° C. for about 30 seconds. A direct positive dye image is formed on this section of the film.

*Example 2*

Another section of the element prepared and exposed in accordance with Example 1 is developed with ammonia. A direct positive dye image is formed.

*Example 3*

Another section of film, prepared as in Example 1, is exposed to ultraviolet light through a positive original to less than 5 seconds and then is immediately heated to about 95° C. for about 7 seconds to develop the image. The entire film is then re-exposed to ultraviolet light for about 30 seconds to decompose the unused diazonium compound. In this manner, a negative reverse vesicular image of the original is produced.

*Example 4*

The fourth section of the film prepared in Example 1 is exposed as in Example 3. The exposed sample is allowed to stand for about 10 seconds to let the nitrogen formed in the exposed area leak out of the system. The film is then reexposed to an ultraviolet light source and is immediately developed in 7 seconds at 95° C. The re-exposure decomposes the diazonium salt, forming nitrogen, in the previously unexposed areas. On immediate development, before the nitrogen formed in the re-exposed areas leaks out of the resin coating, a vesicular direct positive image of the original is produced.

*Examples 5–8*

The following ingredients are dissolved in methanol to produce a solution:

| | Percent |
|---|---|
| Polyvinyl butyral | 15 |
| Citraconic acid | 10 |
| Naphthalene 1,3,6-trisodium sulfonate | 1 |
| 2,2', 4,4' tetrahydroxy biphenyl | 2 |
| p-Diazo dimethylaniline zinc chloride | 1 |
| Zinc chloride | 0.6 |
| Cyanoguanidine | 1.0 |

The solution is coated onto a paper base and is dried and cut in four sections. One of the individual sections is then developed according to each of the Examples 1–4, yielding corresponding images.

*Examples 6–12*

The following ingredients are dissolved in a solvent composed of methyl ethyl ketone and methanol in a 1:1 volume ratio:

| | Percent |
|---|---|
| A blend of 15% polyvinylidene chloride-acrylonitrile copolymer and 4% polymethyl methacrylate | 19 |
| p-Diazo N-ethyl-N-hydroxyethylaniline-½ zinc chloride | 1 |
| Cyanoguanidine | 1 |
| 2,3-dihydroxy naphthalene-6-sodium sulfonate | 2 |
| Citraconic acid | 10 |
| Thiourea | 2 |

The solution is coated onto a polyethylene terephthalate substrate and is dried and cut into four sections. One of the individual sections is then developed according to the procedure of each of the Examples 1–4, yielding corresponding images.

The film elements, copying papers or the like, of the present invention are therefore highly useful in that they permit the production of direct or reverse images from either positive or negative originals.

While the invention has been described with reference to certain preferred embodiments and detailed examples, it should be understood that various changes and modifications may be made in the compositions and elements without departing from the spirit or scope of the invention as expressed in the following claims.

What is claimed is:

1. A self-supporting light-sensitive diazotype element capable of yielding either direct or reverse images upon exposure to light through an original, said element consisting essentially of:
   from 0.4% to 5.0% of a light-sensitive diazonium salt which is stable below about 100° C.,
   from 0.4% to 7.0% of a coupler capable of entering a color-forming reaction with said diazonium salt,
   from 1.0% to 25% of an acid stabilizer,
   from 1% to 10% of a base generator,
   the balance an element forming resin
   said resin being capable of diffusing out nitrogen gas within 10 seconds, and
   said element having a pH of below about 7 under normal ambient conditions.

2. A visual recording element according to claim 1 in the form of a film.

3. The element of claim 1 wherein said base generator is selected from the group consisting of thiourea, guanidine, and cyanoguanidine and mixtures thereof.

4. A visual recording element according to claim 10 in the form of a film.

5. A process for forming azo-dye, color images and vesicular images in an element comprising providing a plurality of segments of the element of claim 1 and imagewise exposing one or more of said segments to light for a period of time greater than 10 seconds to decompose said exposed diazonium salt to form nitrogen and permit outdiffusion of said nitrogen and developing the unexposed diazonium salt to form a color, azo-dye image and imagewise exposing one or more of the other of said segments to light for a period of time to decompose said exposed diazonium salt to form nitrogen and heating for a period of time sufficient to develop a vesicular image, the total time for said exposure and heating steps being not more than about 10 seconds.

References Cited

UNITED STATES PATENTS

| | | | |
|---|---|---|---|
| 2,703,756 | 3/1955 | Herrick et al. | 96—49 |
| 3,027,256 | 3/1962 | Klimkowski et al. | 96—75 |
| 3,032,414 | 5/1962 | James et al. | 96—75 |
| 3,120,437 | 2/1964 | Lindquist | 96—49 |
| 3,154,417 | 10/1964 | Aebi et al. | 96—75 |
| 3,171,743 | 3/1965 | Peticolas | 96—49 |
| 3,298,834 | 1/1967 | Eldred et al. | 96—75 |
| 3,301,679 | 1/1967 | Halperin et al. | 96—75 |
| 3,303,028 | 2/1967 | Aebi et al. | 96—75 |
| 3,307,952 | 3/1967 | Aebi et al. | 96—75 |

NORMAN G. TORCHIN, *Primary Examiner.*

C. L. BOWERS, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,408,192 October 29, 1

Claude M. Aebi

It is certified that error appears in the above identified patent and that said Letters Patent are hereby corrected as shown below:

Column 6, line 31, the claim reference numeral "10" should read -- 3 --

Signed and sealed this 17th day of March 1970.

(SEAL)
Attest:

Edward M. Fletcher, Jr.
Attesting Officer

WILLIAM E. SCHUYLER, JR.
Commissioner of Patents

[redacted]